US010714138B2

(12) United States Patent
Uchida et al.

(10) Patent No.: US 10,714,138 B2
(45) Date of Patent: Jul. 14, 2020

(54) PERPENDICULAR MAGNETIC RECORDING MEDIUM

(71) Applicant: FUJI ELECTRIC CO., LTD., Kawasaki-shi, Kanagawa (JP)

(72) Inventors: Shinji Uchida, Matsumoto (JP); Takehito Shimatsu, Sendai (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 231 days.

(21) Appl. No.: 15/694,074

(22) Filed: Sep. 1, 2017

(65) Prior Publication Data
US 2017/0365286 A1  Dec. 21, 2017

Related U.S. Application Data

(63) Continuation of application No. PCT/JP2016/003521, filed on Jul. 29, 2016.

(30) Foreign Application Priority Data

Sep. 17, 2015 (JP) .................. 2015-184473

(51) Int. Cl.
*G11B 5/65* (2006.01)
*G11B 5/66* (2006.01)
(Continued)

(52) U.S. Cl.
CPC ............ *G11B 5/70615* (2013.01); *G11B 5/65* (2013.01); *G11B 5/66* (2013.01); *G11B 5/714* (2013.01)

(58) Field of Classification Search
None
See application file for complete search history.

(56) References Cited

U.S. PATENT DOCUMENTS 7,927,725 B2 * 4/2011 Ishio ................. B82Y 10/00
428/836
8,241,766 B2 * 8/2012 Lu .................... G11B 5/314
360/131
(Continued)

FOREIGN PATENT DOCUMENTS

CN  102385871 A  3/2012
CN  104685566 A  6/2015
(Continued)

OTHER PUBLICATIONS

Takashi Hasegawa et al. "Ferromagnetic-Paramagnetic Patterning of FePtRh Films by Fe Ion Implantation", IEEE Transactions on Magnetics, vol. 49, No. 7, Jul. 2013. Department of Materials Science and Engineering, Akita University, Akita 010-8502, Japan. Akita Industrial Technology Center (A IT), Akita 010-1623, Japan. Nagamachi Science Laboratory Co. Ltd, Hyogo 661-0976, Japan.
(Continued)

*Primary Examiner* — Kevin M Bernatz
(74) *Attorney, Agent, or Firm* — Rabin & Berdo, P.C.

(57) ABSTRACT

The magnetic recording medium includes at least a nonmagnetic substrate and a magnetic recording layer, the magnetic recording layer consists of a first magnetic recording layer or a plurality of layers including at least the first magnetic recording layer and a second magnetic recording layer, the first magnetic recording layer has a granular structure including a first magnetic crystal grain and a first nonmagnetic crystal grain boundary, the first magnetic crystal grain consists of an ordered alloy having Fe, Pt and Rh, the first nonmagnetic crystal grain boundary consists of carbon, boron or a combination thereof, the second magnetic recording layer has a granular structure including a second magnetic crystal grain and a second nonmagnetic crystal grain boundary, the second magnetic crystal grain consists of
(Continued)

an FePt ordered alloy or an ordered alloy having Fe, Pt and Rh, and the second nonmagnetic crystal grain boundary includes carbon.

9 Claims, 6 Drawing Sheets

(51) Int. Cl.
  *G11B 5/706* (2006.01)
  *G11B 5/714* (2006.01)

(56) References Cited

U.S. PATENT DOCUMENTS

| | | | |
|---|---|---|---|
| 9,117,477 B2* | 8/2015 | Hirotsune | G11B 5/7379 |
| 9,324,353 B2* | 4/2016 | Hellwig | G11B 5/66 |
| 9,672,855 B2* | 6/2017 | Kataoka | G11B 5/65 |
| 9,940,962 B2* | 4/2018 | Thiele | G11B 5/653 |
| 10,115,424 B2* | 10/2018 | Moriya | G11B 5/65 |
| 2003/0108721 A1* | 6/2003 | Fullerton | G11B 5/66 428/195.1 |
| 2009/0040644 A1 | 2/2009 | Lu et al. | |
| 2009/0161254 A1 | 6/2009 | Ishio et al. | |
| 2012/0052330 A1* | 3/2012 | Takekuma | G11B 5/66 428/829 |
| 2012/0196154 A1* | 8/2012 | Uchida | G11B 5/65 428/833.2 |
| 2012/0300600 A1 | 11/2012 | Kanbe et al. | |
| 2013/0258523 A1* | 10/2013 | Maeda | G11B 5/667 360/110 |
| 2015/0132608 A1 | 5/2015 | Kataoka et al. | |
| 2015/0213821 A1 | 7/2015 | Ono et al. | |
| 2015/0213823 A1 | 7/2015 | Uchida | |
| 2016/0225394 A1 | 8/2016 | Moriya et al. | |

FOREIGN PATENT DOCUMENTS

| | | |
|---|---|---|
| CN | 104718574 A | 6/2015 |
| JP | H08-83418 A | 3/1996 |
| JP | 2008-097824 A | 4/2008 |
| JP | 2009-059461 A | 3/2009 |
| JP | 2009-151899 A | 7/2009 |
| JP | 2011-154746 A | 8/2011 |
| JP | 2012-048784 A | 3/2012 |
| JP | 5013100 B2 | 8/2012 |
| JP | 2012-221542 A | 11/2012 |
| JP | 2016-511358 A | 4/2016 |
| WO | WO-2014/087665 A1 | 6/2014 |
| WO | WO-2014/087672 A1 | 6/2014 |
| WO | WO-2015/151425 A1 | 10/2015 |

OTHER PUBLICATIONS

Alagarsamy Perumal et al., "L10 FePt-C Nanogranular Perpendicular Anisotropy Films with Narrow Size Distribution", Appl. Phys. Express, 1, 101301, 2008, 3 pages.

Yuki Inaba et al., "New High Density Recording Technology: Energy Assisted Recording Media", Fuji-jiho vol. 83, No. 4, pp. 257-260, 2010.

R. F. Penoyer, "Automatic Torque Balance for Magnetic Anisotropy Measurements", Rev. Sci. Instr., vol. 30, No. 8, Aug. 1959, pp. 711-714.

Soshin Chikazumi, "Physics of Ferromagnetism" (vol. 2) pp. 10-21, Shokabo Co., Ltd.

* cited by examiner

PERPENDICULAR MAGNETIC RECORDING MEDIUM

CROSS-REFERENCE TO RELATED APPLICATIONS

This application is a continuation application of PCT application No. PCT/JP2016/003521 under 37 Code of Federal Regulations § 1.53 (b) and said PCT application claims the benefit of Japanese Patent Application No. 2015-184473, filed Sep. 17, 2015, which are hereby incorporated by reference wherein in their entirety.

BACKGROUND OF THE INVENTION

Field of the Invention

The present invention relates to a perpendicular magnetic recording medium. In particular, embodiments of the present invention relate to a perpendicular magnetic recording medium comprising a magnetic recording layer having a granular structure which comprises FePtRh as an ordered alloy which may be expected to lower a Curie temperature (Tc), wherein the magnetic recording layer is made into thick film.

Description of the Related Art

Recently, higher density magnetic recording is in high demand. As a technology for realizing the high density of the magnetic recording, a perpendicular magnetic recording method is employed. The perpendicular magnetic recording medium includes a nonmagnetic substrate and a magnetic recording layer comprising a hard magnetic material. The perpendicular magnetic recording medium may further include, in addition to the above components, optionally, a soft magnetic under layer which is formed from a soft magnetic material and plays a role of concentrating a magnetic flux generated by a magnetic head on the magnetic recording layer, an underlayer for orienting the hard magnetic material of the magnetic recording layer in an intended direction, a protective film for protecting a surface of the magnetic recording layer, and the like.

As a material for forming the magnetic recording layer of the perpendicular magnetic recording medium, a granular magnetic material is employed. The granular magnetic material is composed of a magnetic material and a nonmagnetic material, and has a granular structure composed of a magnetic crystal grain and a nonmagnetic material which is segregated so as to surround the circumference of the magnetic crystal grain. Recently, an ordered alloy such as FePt has been used as the magnetic material, and as the nonmagnetic material there are known a single element such as carbon, or a compound comprising carbon, an oxide, a nitride, or the like (for example, refer to Japanese Patent Laid-Open No. H08-083418 (1996) and the like).

In the perpendicular magnetic recording medium, various materials have been proposed as the granular magnetic material. Among those materials, depending on a combination of the ordered alloy as the magnetic crystal grain and the nonmagnetic material, a phenomenon occurs in which, when a film thickness of the magnetic recording layer becomes large, the nonmagnetic material deposits not only on the grain boundary of the magnetic crystal grain, but also on a surface of the magnetic crystal grain, which results in preventing the growth of the magnetic crystal grain. After such a deposition on the surface, when the film thickness of the magnetic recording layer is made thick, so-called secondary growth may happen where the magnetic crystal grain grows on the nonmagnetic material which has deposited on the surface of the magnetic crystal grain. As a result, this secondary growth causes the magnetic anisotropy of the perpendicular magnetic recording medium to be low.

Therefore, various materials are also studied as to the nonmagnetic material contained in the granular magnetic material. For example, Japanese Patent Laid-Open No. 2008-097824 discloses a perpendicular magnetic recording medium comprising a magnetic recording layer which $B_4C$ is used as the nonmagnetic material. Japanese Patent Laid-Open No. 2008-097824 reports that it is possible to realize a high thermal stability and high magnetic anisotropic constant (Ku), and the like, and that film deposition may be achieved by a DC sputtering method. However, Japanese Patent Laid-Open No. 2008-097824 does not refer to use $B_4C$ in combination with the ordered alloy.

Japanese Patent Laid-Open No. 2011-154746 discloses a heat-assisted magnetic recording medium having a magnetic layer of two-layered structure. A first magnetic layer is composed of a granular magnetic material wherein an oxide such as $SiO_2$ is added as a nonmagnetic material to an ordered alloy having an $L1_0$ type crystal structure. Further, a second magnetic layer is a continuous layer (CAP layer) which does not contain the oxide as in the first magnetic layer. The invention of Japanese Patent Laid-Open No. 2011-154746 is characterized in that the content of the nonmagnetic material in the first magnetic layer is reduced from the substrate side toward the second magnetic layer side. Such a structure, according to the invention of Japanese Patent Laid-Open No. 2011-154746, inhibits to interrupt the growth of the crystal grain in the perpendicular direction by an excess deposition of the nonmagnetic material on the top of the crystal grain of the ordered alloy. The structure also realizes a crystal grain of the ordered alloy which has a fine grain size and grows continuously in the perpendicular direction relative to the substrate face.

Further, in addition to the above studies as to the granular magnetic material, for the high density of magnetic recording, a magnetic recording layer constituted from a material having high magnetic anisotropy such as FePt is needed for high thermal stability. However, FePt has high coercive force at room temperature, and recording may not be performed with an ordinary recording head, since only a poor magnetic field is generated. Therefore, a heat-assisted magnetic recording method has been proposed.

A heat-assisted magnetic recording method is a recording method in which a magnetic recording layer is irradiated with laser or the like to be heated and lower the coercive force, and in the heated state, the magnetic field for recording is applied to reverse magnetization. In a heat-assisted magnetic recording method, a magnetic material is heated to near the Curie temperature and recording is performed. For example, the Curie temperature (Tc) of FePt is known to be around 450° C.

On the other hand, recording at high temperatures brings about degradation of a carbon protective film for protecting a magnetic recording layer or a lubricant on a protective film, and causes deterioration of the recording head itself, which becomes, therefore, a factor that significantly lowers the reliability of a magnetic recording device. Accordingly, it is desired to perform recording at temperature as low as possible.

Japanese Patent Laid-Open No. 2009-059461 proposes to provide a plurality of magnetic layers and set a different magnetic anisotropic constant (Ku) and Tc in each magnetic layer to diminish an interrelationship of Ku and Tc. Specifically, according to the proposal of Japanese Patent Laid-Open No. 2009-059461, a magnetic recording layer comprises a first magnetic layer having a Curie temperature Tc1 and a second magnetic layer having a Curie temperature Tc2, and satisfies the relation of Tc1>Tc2. Thereby, when heating the magnetic recording layer to a temperature higher than Tc2, the exchange coupling of the first magnetic layer and the second magnetic layer is canceled to allow to record on the first magnetic layer. Further, in Japanese Patent Laid-Open No. 2009-059461, in order to lower the Tc, it is proposed to add Cu or the like to FePt.

Japanese Patent Laid-Open No. 2009-151899 discloses a magnetic recording medium wherein a magnetic recording layer deposited on a nonmagnetic substrate comprises a plurality of ferromagnetic regions which are separated by a diamagnetic region from each other in the in-plane direction. Japanese Patent Laid-Open No. 2009-151899 discloses that use of an alloy comprising FePtRh as a main component in the ferromagnetic region and the diamagnetic region allows the density high and may separate magnetically between magnetic bits, and it is possible to inhibit degradation of the surface. However, the medium of Japanese Patent Laid-Open No. 2009-151899 is a patterned medium, and there is no proposal as to the lowering of Tc of the magnetic material.

Further, with respect to the lowering of Tc of the magnetic material, for example, Japanese Patent Laid-Open No. 2012-221542 discloses a magnetic recording medium that comprises a substrate, a plurality of underlayers formed on the substrate, and a magnetic layer composed of an alloy having an $L1_0$ structure as a main component wherein the magnetic layer comprises a first magnetic layer consisting of an FePt alloy having the $L1_0$ structure and carbon (C) and a second magnetic layer consisting of an FePt alloy having an $L1_0$ structure and $Cr_2O_3$, $Y_2O_3$ or $Ta_2O_5$. Japanese Patent Laid-Open No. 2012-221542 discloses that Ni may be added to the FePt alloy in the first magnetic layer or the second magnetic layer, and that, thereby, the Curie temperature is lowered to allow to set a low recording temperature.

Further, International Publication No. WO 2014/087665 discloses that, in a magnetic recording medium which includes a nonmagnetic crystal grain boundary containing a Ge oxide and a magnetic layer comprising an ordered alloy of $L1_0$ type, when a magnetic recording layer having a magnetic crystal grain wherein Mn is added and a nonmagnetic crystal grain boundary containing the Ge oxide is employed, due to the lowering of the Curie temperature, a reverse magnetic field is lowered to heat-assisted record easily.

Furthermore, International Publication No. WO 2014/087672 discloses a perpendicular magnetic recording medium comprising a plurality of magnetic recording layers which comprise a first magnetic recording layer and a second magnetic recording layer, and it discloses that, by adding Ni, Mn, and Cr to the first and second magnetic recording layers, magnetic interaction is reduced to change magnetic properties such as a magnetic anisotropy and a Curie temperature, which allows lowering of an ordering temperature.

SUMMARY OF THE INVENTION

Technical Problem

In a perpendicular magnetic recording medium, it is necessary to maintain a high magnetic anisotropy. Further in the perpendicular magnetic recording medium, it is desired that the ordered alloy in the granular structure is divided to the fine grain size (refer to Japanese Patent Laid-Open No. 2011-154746). Furthermore, in magnetic recording media of energy-assisted methods such as heat-assisted method or microwave-assisted method, as a result of the present inventors' study, it has been found to be advantageous that the magnetic recording layer has some large film thickness. Accordingly, it is required that the magnetic recording layer of the perpendicular magnetic recording medium has a certain film thickness by using a finely divided ordered alloy while maintaining a high magnetic anisotropy.

Furthermore, in a heat-assisted magnetic recording medium, it is desired that the recording is achieved at a temperature as low as possible, even when an FePt ordered alloy wherein Cu is added as disclosed in Japanese Patent Laid-Open No. 2009-059461 is used, the Tc is relatively high. For example, when Cu is added in 10 at %, the Tc is about 380° C. Accordingly, it is desired to still lower the Tc of the magnetic material of the magnetic recording medium.

However, the conventional combinations of ordered alloy—nonmagnetic material may not realize a sufficient thickness as a single layer. Further, also in the case of a magnetic recording medium comprising a plurality of magnetic recording layers constituted by a granular magnetic material, a magnetic recording medium has not been obtained, which realizes a certain film thickness while maintaining a sufficiently high magnetic anisotropy. Furthermore, also with respect to the conventional ordered alloy—nonmagnetic material, a material which may realize further lowering of the Tc, is desired.

Accordingly, an object of the present invention is to provide a perpendicular magnetic recording medium comprising a magnetic recording layer which may maintain a high magnetic anisotropy, has a desired film thickness, and may lower the Tc.

Solution to Problem

A magnetic recording medium comprises at least a nonmagnetic substrate and a magnetic recording layer, wherein the magnetic recording layer has a granular structure which includes a first magnetic crystal grain and a first nonmagnetic crystal grain boundary which surrounds the first magnetic crystal grain, the first magnetic crystal grain consists of an ordered alloy having Fe, Pt and Rh, and the first nonmagnetic crystal grain boundary consists of carbon, boron or a combination thereof.

A magnetic recording medium comprises at least a nonmagnetic substrate and a magnetic recording layer, wherein the magnetic recording layer consists of a plurality of layers comprising at least a first magnetic recording layer and a second magnetic recording layer, the first magnetic recording layer has a granular structure which includes a first magnetic crystal grain and a first nonmagnetic crystal grain boundary which surrounds the first magnetic crystal grain, the first magnetic crystal grain consists of an ordered alloy having Fe, Pt and Rh, the first nonmagnetic crystal grain boundary consists of carbon, boron or a combination thereof, the second magnetic recording layer has a granular structure which includes a second magnetic crystal grain and a second nonmagnetic crystal grain boundary which surrounds the second magnetic crystal grain, the second magnetic crystal grain consists of an FePt ordered alloy or an FePtRh ordered alloy, and the second nonmagnetic crystal grain boundary comprises carbon.

According to the magnetic recording medium, it is possible to obtain a perpendicular magnetic recording medium comprising a magnetic recording layer which may maintain the conventional magnetic properties, have a certain film thickness, and lower the Tc.

Further features of the present invention will become apparent from the following description of exemplary embodiments (with reference to the attached drawings).

DESCRIPTION OF EMBODIMENTS

Figure 1:
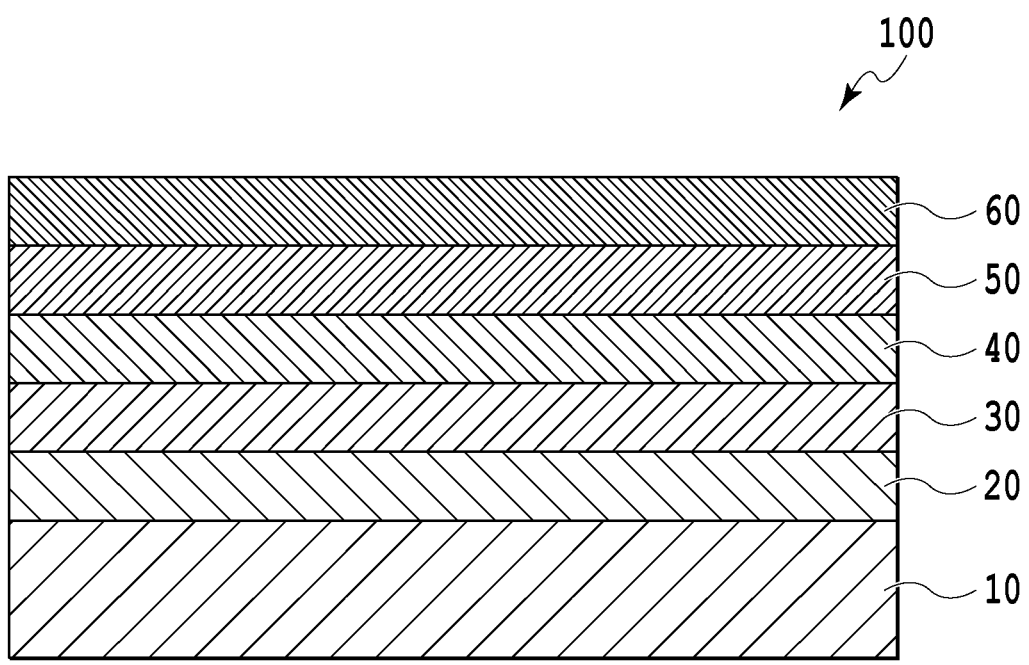
FIG. 1 is a cross-sectional view of a structural example of a magnetic recording medium.

A magnetic recording medium comprises at least a nonmagnetic substrate and a magnetic recording layer. The magnetic recording medium may further comprise, between the substrate and the magnetic recording layer, optional layers which are a layer known in the art such as an adhesion layer, a soft magnetic unde2r layer, a heat-sink layer, an underlayer and/or a seed layer. In addition, the magnetic recording medium may further comprise optional layers which are a layer known in the art such as a protective layer and/or a liquid-lubricant layer, on the magnetic recording layer. As one example of the magnetic recording medium, FIG. 1 shows a structural example of a magnetic recording medium. The example shown in FIG. 1 is a magnetic recording medium 100 comprising a substrate 10, an adhesion layer 20, an underlayer 30, a seed layer 40, a magnetic recording layer 50, and a protective layer 60.

Figure 2:
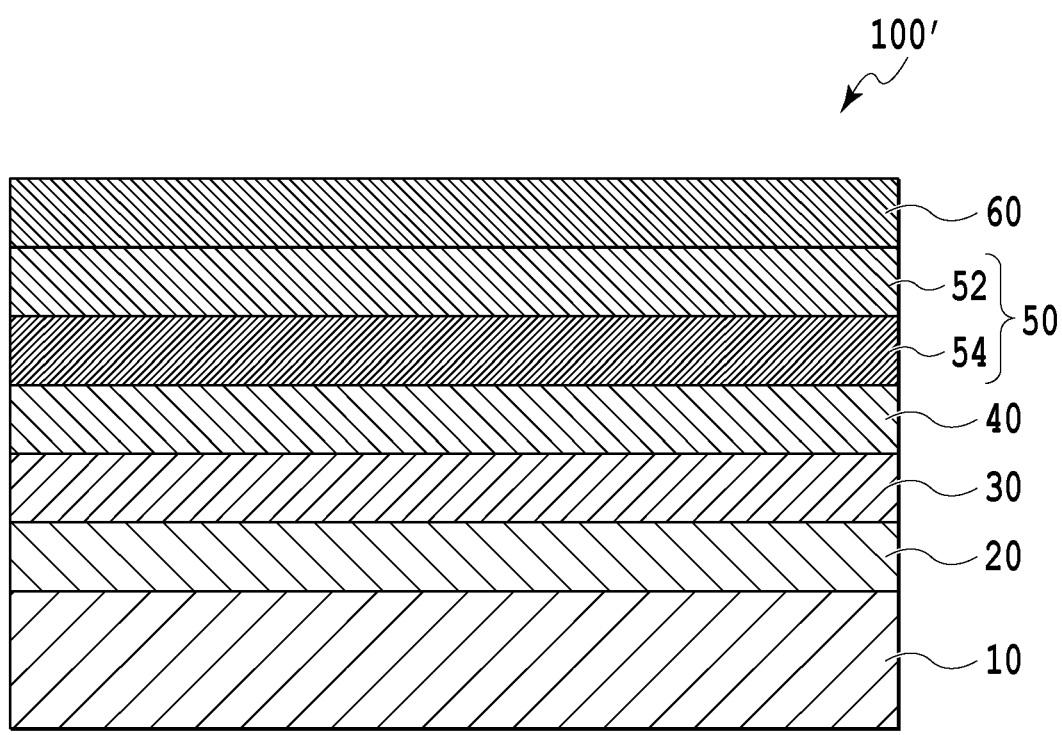
FIG. 2 is a cross-sectional view of another structural example of a magnetic recording medium.
Figure 3:
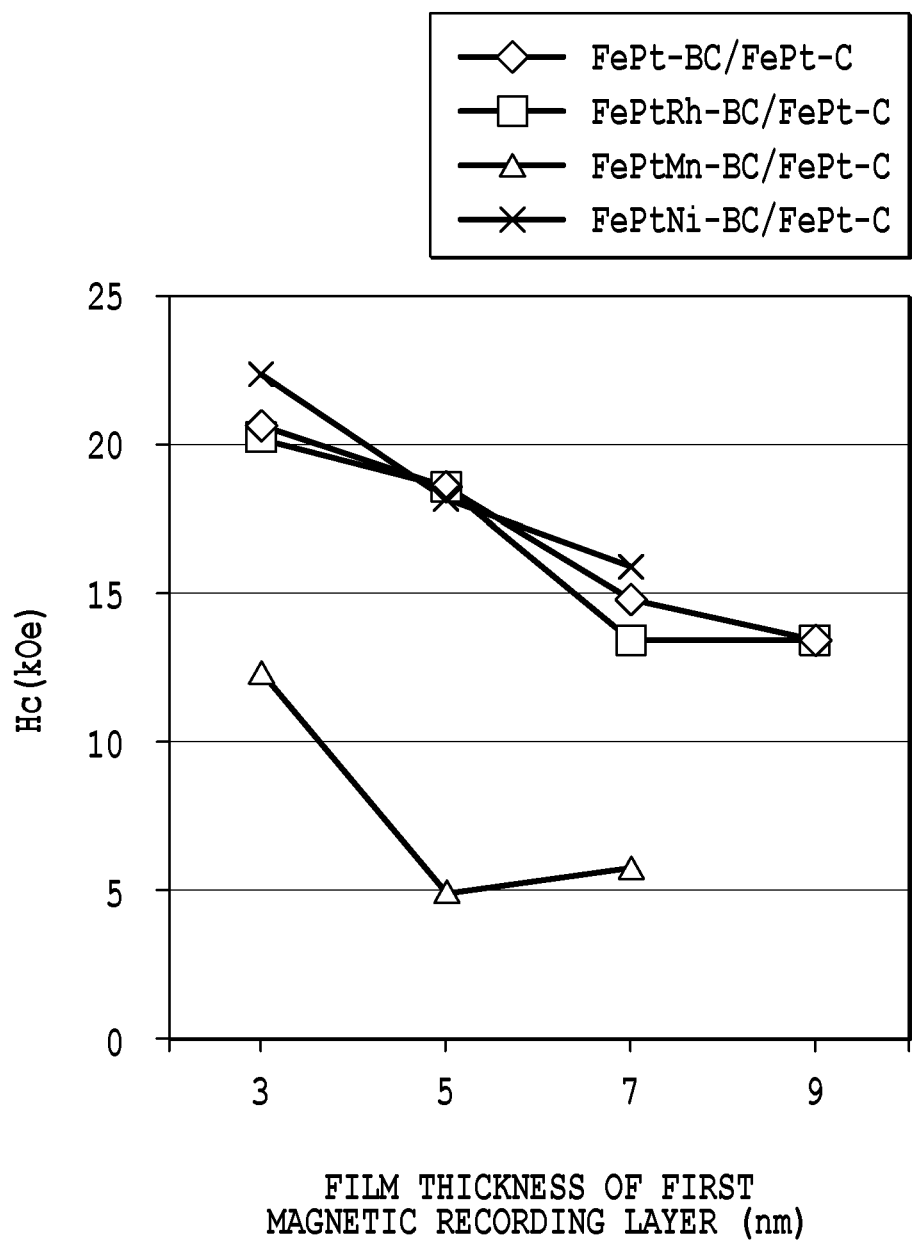
FIG. 3 is a graph where values of coercive force (Hc) in the perpendicular direction relative to the substrate face are plotted relative to a film thickness of the first magnetic recording layer of the magnetic recording medium with respect to Examples and Comparative Examples.
Figure 4:
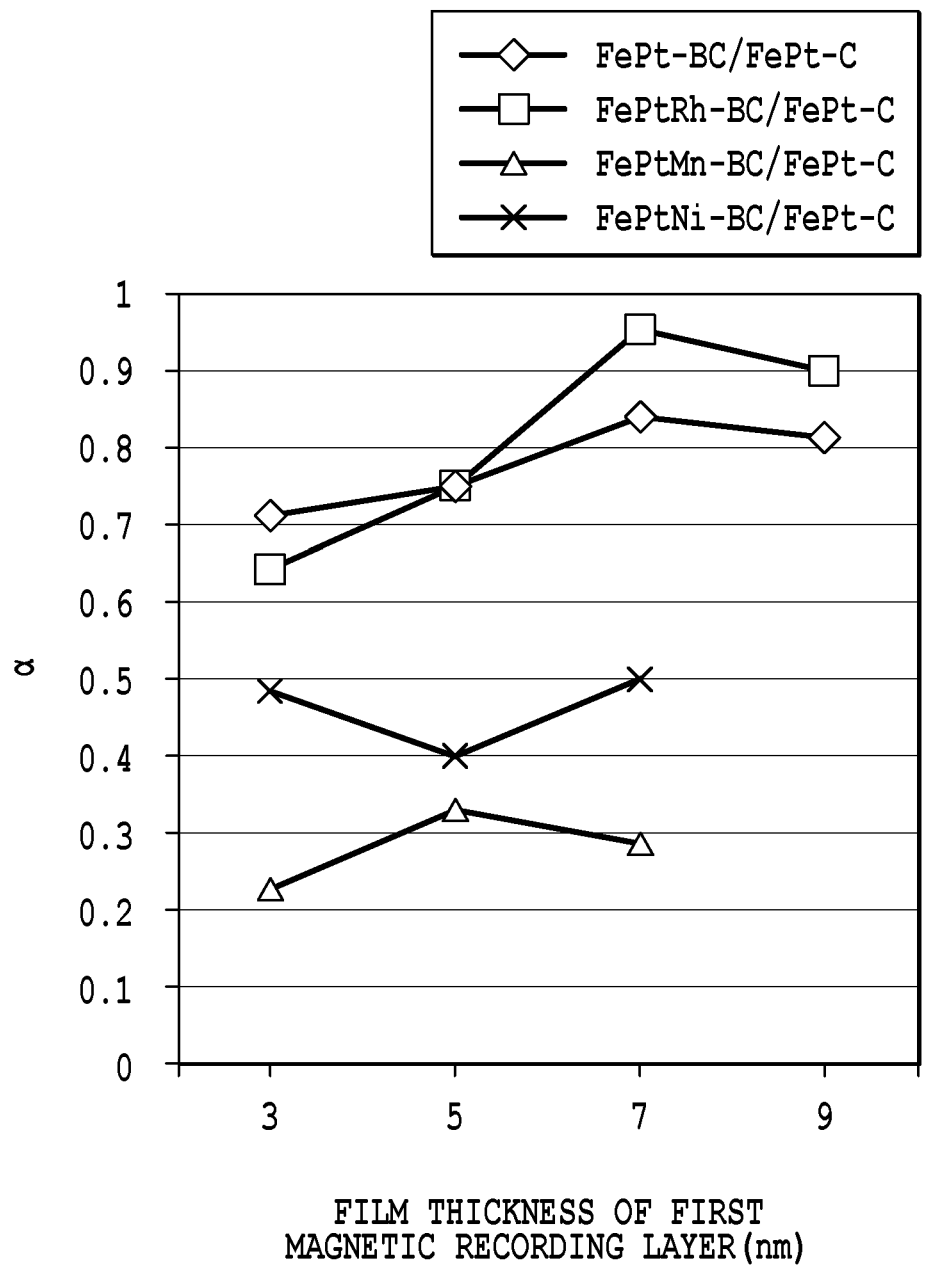
FIG. 4 is a graph where values of slope ($\alpha$) of magnetization curve are plotted relative to a film thickness of the first magnetic recording layer of the magnetic recording medium with respect to Examples and Comparative Examples.
Figure 5:
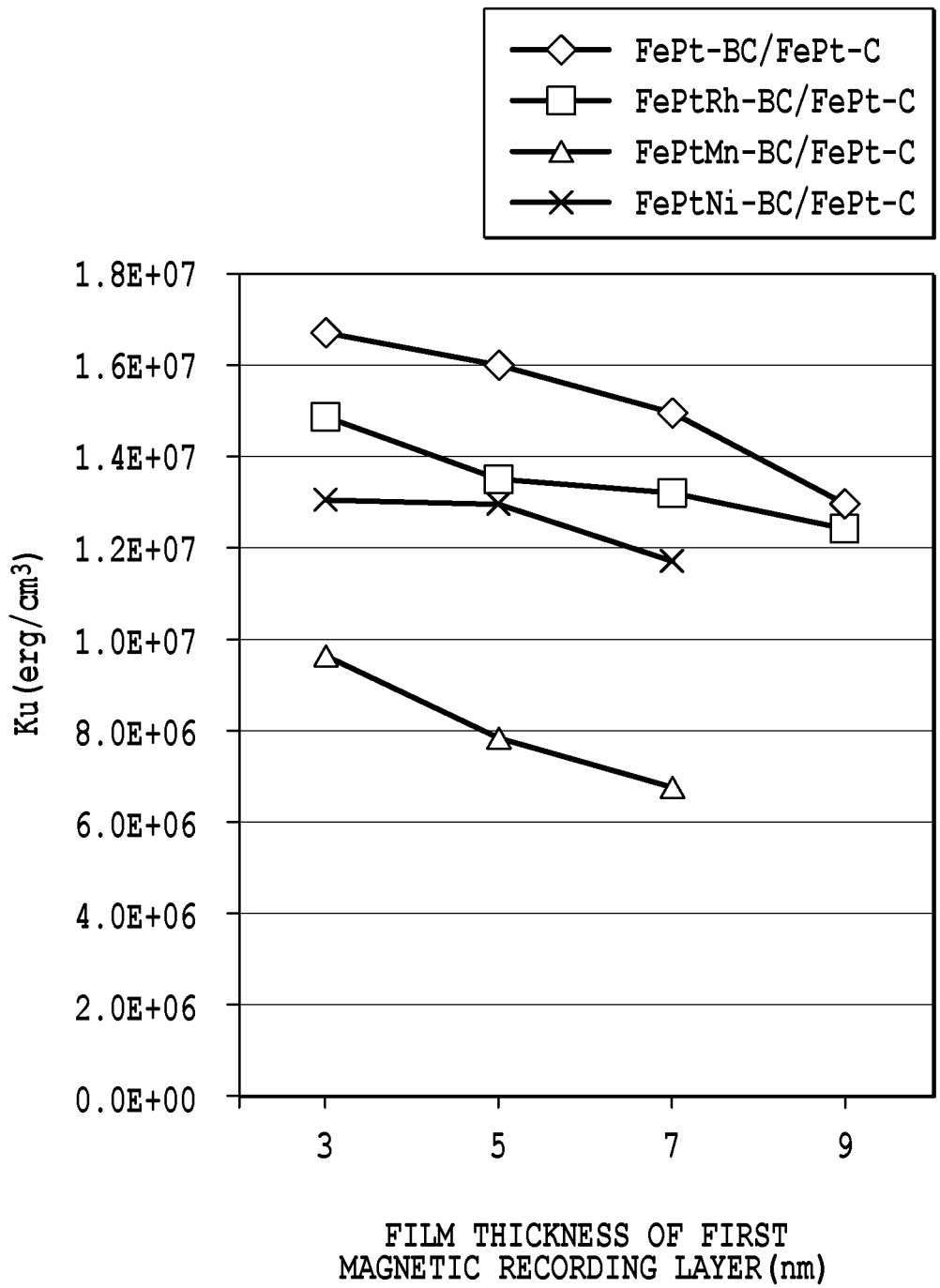
FIG. 5 is a graph where values of magnetic anisotropic constant (Ku) are plotted relative to a film thickness of the first magnetic recording layer of the magnetic recording medium with respect to Examples and Comparative Examples.
Figure 6:
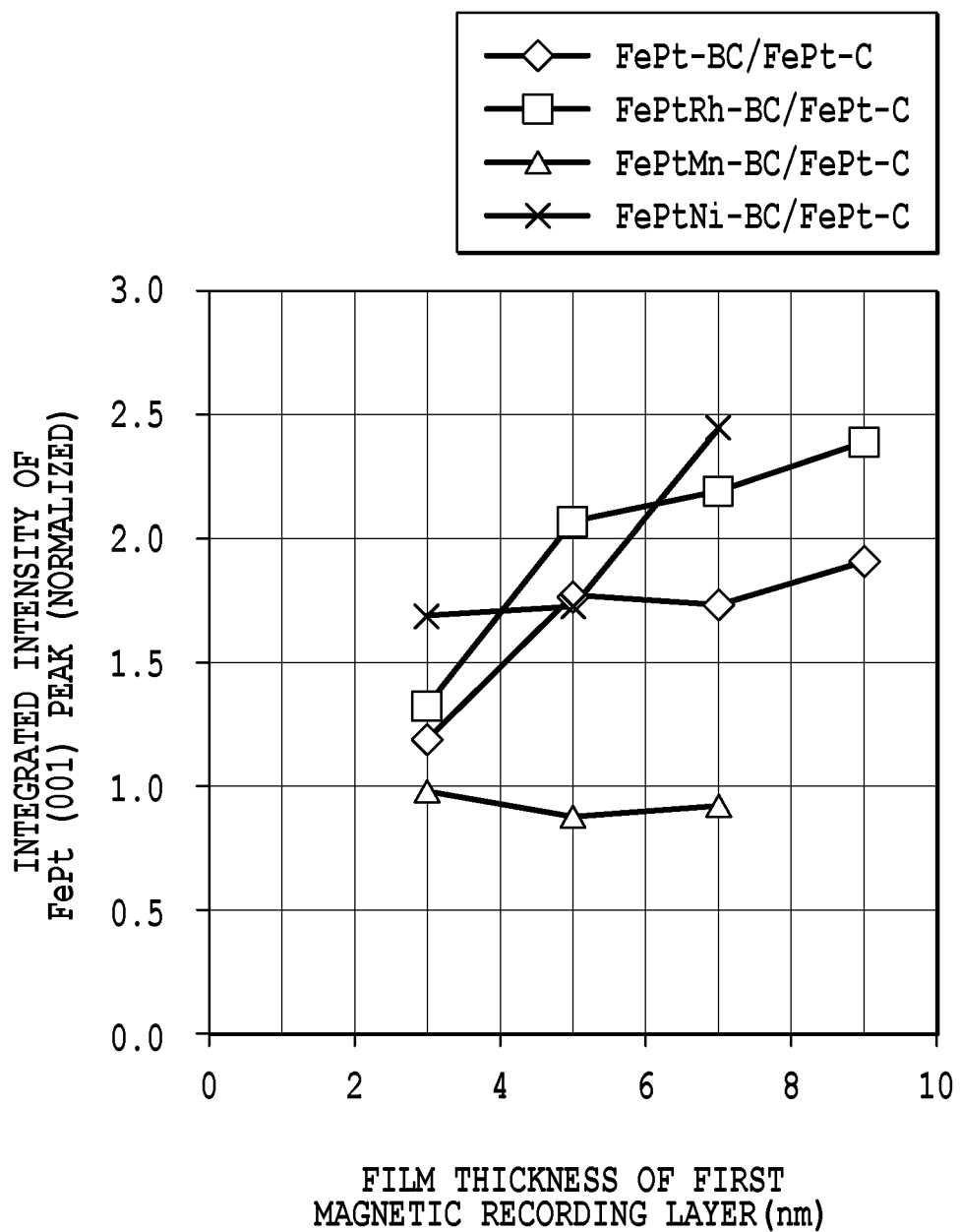
FIG. 6 is a graph where values of integrated intensity (normalized value) of (001) peak of FePt are plotted relative to a film thickness of the first magnetic recording layer of the magnetic recording medium with respect to Examples and Comparative Examples.

Further, FIG. 2 shows another structural example of a magnetic recording medium. As shown in FIG. 2, a magnetic recording medium 100' comprises a substrate 10, an adhesion layer 20, an underlayer 30, a seed layer 40, a magnetic recording layer 50, and a protective layer 60, and the magnetic recording layer 50 is composed of a plurality of layers comprising at least a first magnetic recording layer 52 and a second magnetic recording layer 54. FIG. 2 shows a two-layered structure of the first magnetic recording layer 52 and the second magnetic recording layer 54.

Further, the first magnetic recording layer is constituted by a first magnetic crystal grain and a first nonmagnetic crystal grain boundary which surrounds the first magnetic crystal grain, and the second magnetic recording layer is constituted by a second magnetic crystal grain and a second nonmagnetic crystal grain boundary which surrounds the second magnetic crystal grain.

The magnetic recording medium is applicable to various perpendicular magnetic recording media including a magnetic recording medium of an energy-assisted method such as a heat-assisted method or a microwave-assisted method, for example.

One aspect of the magnetic recording medium is a magnetic recording medium comprising at least a nonmagnetic substrate and a magnetic recording layer, wherein the magnetic recording layer has a granular structure including a first magnetic crystal grain and a first nonmagnetic crystal grain boundary which surrounds the first magnetic crystal grain, the first magnetic crystal grain consists of an FePtRh ordered alloy having Fe, Pt and Rh, and the first nonmagnetic crystal grain boundary consists of carbon, boron or a combination thereof. The first magnetic crystal grain is preferably an $L1_0$ type ordered alloy. While embodiments of the invention are described based on the FePtRh $L1_0$ type ordered alloy, these embodiments are provided by way of example, and the invention is not limited to any one alloy. An ordered alloy, as other examples, can comprise at least one element selected from the group consisting of Fe and Co, and at least one element selected from the group consisting of Pt, Pd, Au and Ir. A preferable ordered alloy is selected from the group consisting of FePt, CoPt, FePd and CoPd.

In the present description, the ordered alloy having Fe, Pt and Rh may also be simply called an FePtRh ordered alloy. In addition, in the present description, the expressions of the alloys or materials represented by elements such as FePtY (Y=Rh, Mn, Ni, etc.), FePtY—X (X=C, B, an oxide, a combination thereof, Y=Rh, Mn, Ni, etc.), and FePt merely mean to have the elements as components, but do not define their compositions of the elements. Accordingly, for example, the expression of FePtRh shows only that the elements of the ordered alloy are Fe, Pt and Rh, but does not show that the ratio of the elements is 1:1:1.

Further, in the present description, in the case that the terms such as "consisting of FePtRh" and "consisting of FePtRh—X (X=C, B, an oxide, or a combination thereof)" are used for expressing materials themselves, these terms mean to have the expressed elements as components, but do not define the ratio among the elements. Accordingly, for example, the term "consisting of FePtRh" means that the material is constituted only by the elements of Fe, Pt and Rh, but does not show that the ratio of these elements is 1:1:1. In the present description, when the ratio of the elements is expressed by a chemical formula, the composition between the ordered alloy and the nonmagnetic grain boundary material is represented by volume %, such as, for instance, "70 vol % (50 at % Fe45 at % Pt5 at % Rh)–30 vol % C," and the composition in the ordered alloy is represented by atom % (at %), such as, for instance, "50 at % Fe 45 at % Pt 5 at % Rh."

In the magnetic recording medium comprising the magnetic recording layer consisting of an FePtRh ordered alloy, the present inventors have found that it is possible to maintain a high Ku value and lower the Tc. Also in the case of a magnetic material having the granular structure which comprises the FePtRh ordered alloy as the magnetic crystal grain, lowering of the Tc may be expected as well. Further, the present inventors have found that the magnetic material wherein the FePtRh ordered alloy is included as the magnetic crystal grain and the material consisting of carbon, boron or a combination thereof is included as the nonmagnetic crystal grain boundary is excellent as the material for the magnetic recording layer.

Another aspect of the magnetic recording medium is a magnetic recording medium comprising at least a nonmagnetic substrate and a magnetic recording layer, wherein the magnetic recording layer is composed of a plurality of layers comprising at least a first magnetic recording layer and a second magnetic recording layer, the first magnetic recording layer has a granular structure which includes a first magnetic crystal grain and a first nonmagnetic crystal grain boundary which surrounds the first magnetic crystal grain, the first magnetic crystal grain consists of an FePtRh ordered alloy, the first nonmagnetic crystal grain boundary consists of carbon, boron or a combination thereof, the second magnetic recording layer has a granular structure which includes a second magnetic crystal grain and a second nonmagnetic crystal grain boundary which surrounds the second magnetic crystal grain, the second magnetic crystal grain consists of an FePt ordered alloy or an FePtRh ordered alloy, and the second nonmagnetic crystal grain boundary comprises carbon. The first magnetic crystal grain or the second magnetic crystal grain is preferably an $L1_0$ type ordered alloy.

In the aforementioned magnetic recording medium comprising a plurality of magnetic recording layers, the present inventors have newly found that, by forming a layer consisting of FePt—C or FePtRh—C as a template layer, FePtRh—X (X being C, B or a combination thereof) may be grown on the template layer while forming the granular structure, to form the magnetic recording layer in a desired film thickness. In addition, it has also been discovered that a perpendicular magnetic recording medium comprising such a magnetic recording layer has a high magnetic anisotropy. In the aforementioned magnetic recording medium comprising a plurality of magnetic recording layers, the template layer is the second magnetic recording layer.

The magnetic recording medium is based on each of the aforementioned knowledge, which may realize the larger film thickness of the magnetic recording layer while maintaining the high magnetic anisotropy with a magnetic recording layer having a granular structure, wherein the Tc of the magnetic material of the magnetic recording layer may be expected to be lowered.

In the following, each component of the magnetic recording medium is explained.

The substrate 10 may be various substrates having a smooth surface. For example, the substrate 10 may be formed by use of those materials used generally in magnetic recording medium. Usable materials include a NiP-plated Al alloy, MgO single crystal, $MgAl_2O_4$, $SrTiO_3$, reinforced glass, crystallized glass, etc.

The adhesion layer 20 that may optionally be provided is used for enhancing adhesion between a layer formed on the adhesion layer 20 and a layer formed under the adhesion layer 20. The layer formed under the adhesion layer 20 includes the substrate 10. Materials for forming the adhesion layer 20 include metals such as Ni, W, Ta, Cr and Ru, and alloys comprising the aforementioned metal. The adhesion layer 20 may be a single layer, or have a laminated structure of a plurality of layers.

A soft magnetic under layer (not shown), which may be provided optionally, controls a magnetic flux from the magnetic head to improve properties in recording and reproducing of a magnetic recording medium. Materials for forming the soft magnetic under layer include (i) crystalline materials such as a NiFe alloy, a Sendust (FeSiAl) alloy and a CoFe alloy, (ii) microcrystalline materials such as FeTaC, CoFeNi and CoNiP, or (iii) amorphous materials including Co alloys such as CoZrNb and CoTaZr. The optimal value of the film thickness of the soft magnetic under layer depends on a structure and characteristics of a magnetic head for use in magnetic recording. When the soft magnetic under layer is formed by continuous deposition with another layer, in view of a balance with productivity, the soft magnetic under layer preferably has film thickness within a range of 10 nm-500 nm (both inclusive).

When the magnetic recording medium of the present invention is used in a heat-assisted magnetic recording method, a heat-sink layer (not shown) may be provided. The heat-sink layer is a layer for effectively absorbing excess heat of the magnetic recording layer 50 generated in the heat-assisted magnetic recording. The heat-sink layer may be formed by use of a material with a high heat conductivity and specific heat capacity. Such materials include a Cu simple substance, an Ag simple substance, an Au simple substance or alloy materials mainly composed of them. Here, the phrase "mainly composed of" shows that a content of the material is 50 wt % or more. Further, from the viewpoint of strength or the like, the heat-sink layer may be formed by use of an Al—Si alloy, a Cu—B alloy, or the like.

Moreover, the heat-sink layer may be formed by use of a Sendust (FeSiAl) alloy, a soft magnetic CoFe alloy, or the like. It is also possible to give the heat-sink layer, a function of concentrating a magnetic field in a perpendicular direction generated by the head on the magnetic recording layer 50 to thereby complement the function of the soft magnetic under layer, as the result of using the soft magnetic material. The optimal value of the film thickness of the heat-sink layer changes depending on a heat quantity and heat distribution in the heat-assisted magnetic recording as well as the structure and thickness of respective layers of the magnetic recording medium.

In a case of formation of the heat-sink layer by continuous deposition with another layer, the film thickness of the heat-sink layer is preferably 10 nm or more and 100 nm or less, in view of a balance with productivity. The heat-sink layer may be formed by use of any method known in the art such as a sputtering method or a vacuum deposition method. In common cases, the heat-sink layer is formed by use of the sputtering method. The heat-sink layer may be provided between the substrate 10 and the adhesion layer 20, between the adhesion layer 20 and the underlayer 30, or the like, in consideration of the properties required for the magnetic recording medium.

The underlayer 30 is a layer for controlling crystallinity and/or crystalline orientation of the seed layer 40 formed on the upper side. The underlayer 30 may be a single layer or multiple layers. The underlayer 30 is preferably nonmagnetic. A nonmagnetic material used for forming the underlayer 30 includes (i) a single metal such as Pt metal or Cr metal, or (ii) an alloy obtained by adding at least one kind of metal selected from the group consisting of Mo, W, Ti, V, Mn, Ta and Zr to Cr being a main component. The underlayer 30 may be formed by use of any method known in the art, such as a sputtering method.

The function of the seed layer 40 is to control a grain size and crystalline orientation of magnetic crystal grains in the magnetic recording layer 50 being the upper layer. The seed layer 40 may be given a function of securing adhesion between a layer under the seed layer 40 and the magnetic recording layer 50. Further, another layer, such as an intermediate layer, may be disposed between the seed layer 40 and the magnetic recording layer 50. When the intermediate layer or the like is disposed, the grain size and crystalline orientation of magnetic crystal grains in the magnetic recording layer 50 are controlled by controlling the grain size and crystalline orientation of crystal grains in the intermediate layer or the like. The seed layer 40 is preferably nonmagnetic. The material of the seed layer 40 is selected suitably in accordance with the material of the magnetic recording layer 50.

More specifically, the material of the seed layer 40 is selected in accordance with the material of magnetic crystal grains in the magnetic recording layer. For example, when the magnetic crystal grain in the magnetic recording layer 50 is formed from an $L1_0$ type ordered alloy, preferably the seed layer 40 is formed by use of a compound of a NaCl type crystal structure. Particularly preferably, the seed layer 40 may be formed by use of an oxide such as MgO or $SrTiO_3$, or a nitride such as TiN. Further, the seed layer 40 may also be formed by laminating a plurality of layers comprising the above-described material. One example is a two-layered structure wherein MgO is laminated on ZnO. From the viewpoint of improving crystallinity of magnetic crystal grains in the magnetic recording layer 50 and improving productivity, the seed layer 40 has thickness of 1 nm-60 nm, preferably thickness of 1 nm-20 nm. The seed layer 40 may be formed by use of any method known in the art such as a sputtering method.

The magnetic recording layer 50 is a magnetic recording layer of a single layer, or a magnetic recording layer comprising at least two layers, i.e. a first magnetic recording layer 52 and a second magnetic recording layer 54.

(Case of Magnetic Recording Layer of Single Layer)

The magnetic recording layer 50 of a single layer as one embodiment comprises an ordered alloy consisting of FePtRh which constitutes the magnetic crystal grain, and a material consisting of the element which constitutes the nonmagnetic crystal grain boundary surrounding the magnetic crystal grain. The element which constitutes the nonmagnetic crystal grain boundary is C, B or a combination thereof.

The magnetic recording layer 50 may be formed by use of FePtRh—X (wherein X is a nonmagnetic crystal grain boundary material, and is C, B or a combination thereof), and in such a case, contents of Fe, Pt and Rh in the FePtRh ordered alloy are preferably 30 to 70% by atom of Fe, 30 to 70% by atom of Pt, and 1 to 25% by atom of Rh based on the total atoms of FePtRh. Further, amounts of FePtRh and element X are preferably 50 to 90 vol % of FePtRh, and 10 to 50 vol % of the element X based on the total amount of the FePtRh—X. Note that, in the present description, attached claims and drawings, "% by atom" may be described as "at %." As explained above, in the present description, with respect to the composition of the materials of the magnetic recording layer, the composition of the elements of the ordered alloy having Fe, Pt and Rh is represented by % by atom, and the composition of the magnetic crystal grain and the nonmagnetic crystal grain boundary is represented by Vol %.

The magnetic recording layer 50 of a single layer may be formed by depositing the elements of the FePtRh ordered alloy and the element X by use of a sputtering method.

"Sputtering" as used herein means only a step of injecting atoms, clusters or ions from a target by collision of ions with high energy, and does not mean that all elements contained in the ejected atoms, clusters or ions are fixed onto a substrate to be deposited. In other words, a thin film obtained in the step of "sputtering" as used herein not necessarily includes elements arriving at the substrate to be deposited at a ratio of the amount as arrived. As targets to be used in the formation of the magnetic recording layer 50 of a single layer, those may be used a target which contains all of the elements of the ordered alloy and element X in a predetermined ratio. Alternatively, each element of the ordered alloy and the element X may be used as separated targets. Further, a target which contains each element of the ordered alloy in a predetermined ratio and a target of the element X may be used. In either case, the ratio of the magnetic crystal grain and the nonmagnetic crystal grain boundary may be controlled by adjusting electric power applied to respective targets. Specifically, for example, the magnetic recording layer of a single layer may be deposited by a co-sputtering method by use of each target of Fe, Pt, Rh, B and C.

When the magnetic recording layer 50 of a single layer is formed, the substrate is heated. A temperature of the substrate at the heating is within the range of 300° C.-700° C. By employing the temperature of the substrate within the range, degree of order of the ordered alloy in the magnetic recording layer 50 of a single layer may be improved.

Further, the magnetic recording layer 50 of a single layer has a thickness of 1 to 10 nm, and preferably 2 to 4 nm.

Case of Comprising a Plurality of Magnetic Recording Layers

In the magnetic recording medium, the magnetic recording layer 50 may comprise a plurality of layers. Preferably, the magnetic recording layer 50 comprises at least two layers of the first magnetic recording layer 52 and the second magnetic recording layer 54.

In the following explanation, the case of comprising a plurality of magnetic recording layers is explained by taking an instance where as shown in FIG. 2, two layers of the first magnetic recording layer 52 and the second magnetic recording layer 54 are included.

The first magnetic recording layer 52 has the granular structure which includes the first magnetic crystal grain and the first nonmagnetic crystal grain boundary which surrounds the first magnetic crystal grain, and the second magnetic recording layer 54 has the granular structure which includes the second magnetic crystal grain and the second nonmagnetic crystal grain boundary which surrounds the second magnetic crystal grain.

In the magnetic recording medium having the magnetic recording layer of a plurality of layers, the first magnetic recording layer 52 has the similar constitution to that of the above magnetic recording layer of a single layer. Accordingly, the first magnetic recording layer has the granular structure which is constituted by the first magnetic crystal grain consisting of the FePtRh ordered alloy, and the first nonmagnetic crystal grain boundary consisting of C, B or a combination thereof. The first magnetic recording layer 52 may be deposited by the similar method to that explained in the FePtRh—X (X=B, C or a combination thereof) of a single layer.

The second magnetic recording layer 54 is a layer which functions as the template layer of the above first magnetic recording layer. The second magnetic recording layer 54 has the granular structure which is constituted by the second magnetic crystal grain consisting of the FePt ordered alloy or the FePtRh ordered alloy, and the second nonmagnetic crystal grain boundary consisting of carbon (C). The second magnetic recording layer 54 may be deposited by the similar method to that in the first magnetic recording layer. In the deposition, a target for sputtering may be used wherein Fe, Pt, Rh and C are properly combined. For example, the second magnetic recording layer may be deposited by the co-sputtering method by use of each target of Fe, Pt, Rh and C.

The first magnetic recording layer 52 may be formed, in the same manner as in the above magnetic recording layer of a single layer, by use of FePtRh—X (wherein X is C, B or a combination thereof), and in such a case, contents of Fe, Pt and Rh in the FePtRh ordered alloy are preferably 30 to 70% by atom of Fe, 30 to 70% by atom of Pt, and 1 to 25% by atom of Rh based on the total atoms of FePtRh. Further, amounts of FePtRh and element X are preferably 50 to 90 vol % of FePtRh, and 10 to 50 vol % of the element X based on the total amount of the FePtRh—X.

The second magnetic recording layer 54 can be formed by use of FePt—C or FePtRh—C. When FePt—C is used for the second magnetic recording layer 54, contents of Fe and Pt in the FePt ordered alloy are preferably 30 to 70% by atom of Fe, and 30 to 70% by atom of Pt based on the total atoms of FePt. Further, contents of FePt and C in FePt—C are preferably 50 to 90 vol % of FePt and 10 to 50 vol % of C, respectively, based on the total amount of the FePt—C. Furthermore, when the FePtRh—C is used for the second magnetic recording layer 54, contents of Fe, Pt and Rh in the FePtRh ordered alloy are preferably 30 to 70% by atom of Fe, 30 to 70% by atom of Pt, and 1 to 25% by atom of Rh based on the total atoms of FePtRh. Further, contents of FePtRh and C in FePtRh—C are preferably 50 to 90 vol % of FePtRh and 10 to 50 vol % of C, respectively, based on the total amount of the FePtRh—C.

In the magnetic recording layer 50 in the form comprising a plurality of layers, the second nonmagnetic material which surrounds the second magnetic crystal grain of the second magnetic recording layer 54 is C. By forming the first magnetic recording layer 52 by use of the granular magnetic material of the FePtRh—X (wherein X is C, B or a combination thereof) having the first nonmagnetic material on the second magnetic recording layer 54, the first magnetic recording layer 52 of the granular structure which follows the granular structure of the second magnetic recording layer 54 may be formed effectively, and thus the larger thickness of the magnetic recording layer may be realized.

In the magnetic recording medium, the magnetic recording layer 50 of a single layer or a plurality of layers may have a structure wherein further magnetic recording layers are laminated. For example, the magnetic recording layer 50 may have a structure wherein a plurality of the above magnetic recording layers of a single layer are laminated. Alternatively, the magnetic recording layer may have a structure wherein, a plurality of sets that the first magnetic recording layer and the second magnetic recording layer are combined are laminated, or may have a structure wherein, on the above magnetic recording layer of a single layer or the first magnetic recording layer or the second magnetic recording layer, a magnetic recording layer consisting of a material which has a different composition or elements from those magnetic recording layer is further laminated. Further, the magnetic recording layer 50 may have a structure wherein the second magnetic recording layer, the first magnetic recording layer and the second magnetic recording layer are laminated in this order. Furthermore, an additional layer may be provided such as CAP layer for the magnetic recording layer 50.

As mentioned above, by forming the second magnetic recording layer 54 as the template layer wherein FePt—C or FePtRh—C is used as the magnetic material, and, on the second magnetic recording layer 54, forming the first magnetic recording layer 52 of the granular magnetic material of FePtRh—X (wherein X is C, B or a combination thereof), the larger total thickness of the magnetic recording layer 50 may be realized with preservation of the high magnetic anisotropy.

In the magnetic recording medium according to the present embodiment, the thickness of the second magnetic recording layer 54 is 4 nm or less, and preferably 2-4 nm. If the thickness is more than 4 nm, inhibition of growth and secondary growth of the ordered alloy occur. From the viewpoint of maintaining the high magnetic anisotropy, the thickness of the first magnetic recording layer 52 is preferably 3 nm or more, and more preferably 3-9 nm.

The thickness of the magnetic recording layer 50 composed of a plurality of layers is not particularly limited. However, from the viewpoint of obtaining both of high productivity and high recording density, the magnetic recording layer 50 has a thickness desirably of at least 5 nm or more, preferably 8 nm or more. Preferred thickness of the magnetic recording layer 50 is 6-16 nm, and more preferably 8-11 nm.

Further, the magnetic recording layer 50 is, in either case of a single layer or a plurality of layers, constituted by the granular magnetic material comprising FePtRh ordered alloy which may lower the Tc. Therefore, the Tc of magnetic recording media which comprises the magnetic material may be also expected to be lowered.

The magnetic recording layer 50 may further comprise one or plurality of additional magnetic recording layers, in addition to the first magnetic recording layer 52 and the second magnetic recording layer 54. Each of one or a plurality of additional magnetic recording layers may have either a granular structure or a non-granular structure. For example, an ECC (Exchange-coupled Composite) structure may be formed by sandwiching a coupling layer comprised of Ru or the like between the laminated structure comprised of the first magnetic layer 52 and the second magnetic layer 54 and the additional magnetic layer. Alternatively, a magnetic recording layer not including a granular structure may be provided on the upper part of a laminated structure of the first magnetic recording layer 52 and the second magnetic recording layer 54, as a continuous layer. The continuous layer includes a so-called CAP layer.

The protective layer 60 may be formed by use of a material commonly used in the art of a magnetic recording medium. Specifically, the protective layer 60 may be formed by use of a nonmagnetic metal such as Pt or Ta, a carbon-based material such as diamond-like carbon, or a silicon-based material such as silicon nitride. Further, the protective layer 60 may be a single layer, or may have a laminated structure. The protective layer 60 of a laminated structure, for example, may be a laminated structure of two types of carbon-based materials having different properties, a laminated structure of a metal and a carbon-based material, or a laminated structure of a metal oxide film and a carbon-based material. The protective layer 60 may be formed by use of any process known in the art, such as a CVD method, a sputtering method (including a DC magnetron sputtering method etc.) and a vacuum deposition method.

Further, the magnetic recording medium of the present invention may optionally further comprise a liquid-lubricant layer (not shown) on the protective layer 60. The liquid-lubricant layer may be formed by use of a material commonly used in the art of magnetic recording medium. Materials of the liquid-lubricant layer include, for example, perfluoropolyether-based lubricants, etc. The liquid-lubricant layer may be formed, for example, by use of a coating method such as a dip coating method or a spin coating method.

EXAMPLE

In the following, the present invention is explained by referring to Examples, but the present invention is not limited to the following Examples.

Measurement of Tc and Magnetic Properties

The Tc and magnetic properties of the magnetic recording medium described in Examples are evaluated in the following procedures.

A saturation magnetization Ms of the obtained magnetic recording medium was measured by use of a vibrating sample magnetometer (VSM). Further, the obtained magnetic recording medium was heated from room temperature (RT: 25° C.) to 177° C., to measure the saturation magnetization Ms from room temperature to 177° C. by use of the vibrating sample magnetometer (VSM). Furthermore, by plotting a plurality of measuring temperatures T which include room temperature and 177° C. and the square of the saturation magnetization $Ms^2$ (T), a regression line was obtained according to the least-squares method. The obtained regression line was extrapolated to the point of $Ms^2=0$ to determine the Curie temperature Tc.

An M-H hysteresis loop of the obtained magnetic recording medium was measured by use of a PPMS apparatus (manufactured by Quantum Design Co., Ltd.; Physical Property Measurement System). From the obtained M-H hysteresis loop, a saturation magnetization Ms, a coercive force Hc in the perpendicular direction relative to the substrate face, and an α value of the M-H hysteresis loop was determined. The α value is desirably a value near to 1. The α value means a slope of a magnetization curve near the coercive force (H=Hc), and may be calculated according to the equation: $\alpha=4\pi\times(dM/dH)$. In the determination of the α value, "$emu/cm^3$" is used for the unit of M, and "Oe" is used for the unit of H. When the magnetic crystal grains in the magnetic recording layer 50 are not suitably separated magnetically, the α value is increased. On the other hand, when the variation of the magnetic properties of the magnetic crystal grains is large, for example when there is a crystal grain with bringing about the secondary growth, the α value is decreased. Note that the preferred range of α was determined to be 0.6 or more and 2.5 or less. Note that, the coercive force Hc in the perpendicular direction relative to the substrate face, herein is also called simply coercive force Hc.

Further, dependency of spontaneous magnetization on a magnetic field application angle was evaluated by use of the PPMS apparatus to determine a magnetic anisotropic constant Ku. In the determination of the magnetic anisotropic constant Ku, techniques described in R. F. Penoyer, "Automatic Torque Balance for Magnetic Anisotropy Measurements," The Review of Scientific Instruments, 711-714, Vol. 30, No. 8, August 1959, or in Soshin Chikazumi, "Physics of Ferromagnetism" (vol. 2) 10-21, Shokabo Co., Ltd. were used (see R. F. Penoyer, Rev. Sci. Instr. p 711, 30(1959) and Soshin Chikazumi, "Physics of Ferromagnetism" (vol. 2) pages 10-21, Shokabo Co., Ltd.). Here, the magnetic anisotropic constant Ku is measured as an energy value per total volume of the magnetic crystal grain and the nonmagnetic crystal grain boundary. Here, with respect to the magnetic properties, in addition to the Ku [film] per total volume, a net magnetic anisotropic constant Ku [grain] of the magnetic crystal grain was calculated. Further, also with respect to the saturation magnetization Ms, an Ms [film] per total volume and a net saturation magnetization Ms [grain] were calculated in the similar manner. The magnetic property mentioned as [film] shows a value of property per total volume as the whole of film, and the magnetic property mentioned as [grain] shows a value of net magnetic material which is calculated by removing the volumes of the nonmagnetic grain boundary material such as B, C and $SiO_2$ from the whole of film. Furthermore, an integrated intensity of (001) peak of FePt was measured by an X-ray diffraction (XRD) analysis.

1. Experimental Example 1 and Experimental Example 2

Experimental Example 1

A magnetic recording medium was prepared comprising a substrate, and a magnetic recording layer consisting of an FePtRh ordered alloy of a single layer.

A chemically reinforced glass substrate having a smooth surface (N-10 glass substrate, manufactured by HOYA) was washed to prepare a substrate 10. The substrate 10 after washing was introduced into a sputtering apparatus of an in-line system. By a DC magnetron sputtering method using a pure Ta target in Ar gas of 0.5 Pa in pressure, a Ta adhesion layer 20 of 5 nm in thickness was formed. The temperature of the substrate in the formation of the Ta adhesion layer was room temperature (25° C.). Sputtering electric power in the formation of the Ta adhesion layer was 100 W.

Then, by a DC magnetron sputtering method using a pure Cr target in Ar gas of 0.5 Pa in pressure, a Cr underlayer 30 of 20 nm in thickness was obtained. The temperature of the substrate in the formation of the Cr underlayer 30 was room temperature (25° C.). Sputtering electric power in the formation of the Cr underlayer 30 was 300 W.

Then, by an RF magnetron sputtering method using a MgO target in Ar gas of 0.1 Pa in pressure, a MgO seed layer 40 of 5 nm in thickness was formed. The temperature of the substrate in the formation of the MgO seed layer 40 was room temperature (25° C.). Sputtering electric power in the formation of the MgO seed layer 40 was 200 W.

Next, with respect to an FePtRh layer, a laminated body in which the MgO seed layer 40 was formed was heated to 430° C. and a layer consisting of FePtRh was formed by a DC magnetron sputtering method using an FePt target and an Rh target in Ar gas of 1.5 Pa in pressure, to thereby give a magnetic recording layer. The electric powers applied to each of the targets in the formation of the layer consisting of the FePtRh were 300 W (FePt) and 130 W (Rh), respectively. Contents (% by atom) of each element of the layer consisting of FePtRh are shown in Table 1.

Finally, by a DC sputtering method using a Pt target in Ar gas of 0.5 Pa in pressure, a Pt protective layer 60 of 5 nm in thickness was formed to give a magnetic recording medium. The temperature of the substrate in the formation of the protective layer was room temperature (25° C.). Sputtering electric power in the formation of the Pt protective layer 60 was 50 W.

Experimental Example 2

As Experimental Example 2, a magnetic recording medium comprising a magnetic recording layer was prepared consisting of an FePt ordered alloy.

The magnetic recording medium comprising the magnetic recording layer consisting of an FePt ordered alloy of a single layer was prepared in the following manner. In the similar way to Experimental Example 1, a laminated body in which the MgO seed layer 40 was formed was obtained. The laminated body was heated to 430° C., to form an FePt layer consisting of FePt by a DC magnetron sputtering method using an FePt target in Ar gas of 1.5 Pa in pressure. A thickness of the FePt layer was 10 nm. Electric power applied to the target in the formation of the FePt layer was 300 W (FePt). Contents (% by atom) of each element of the layer consisting of FePt are shown in Table 1.

Evaluation

Tc, Ms and Ku of the above Experimental Example 1 and Experimental Example 2 were measured. The results are shown in Table 1.

TABLE 1

| Material | Tc (° C.) | Magnetic properties at RT | | Magnetic properties at 177° C. | |
|---|---|---|---|---|---|
| | | Ms (emu/cc) | Ku (erg/cc) | Ms (emu/cc) | Ku (erg/cc) |
| Experimental Example 2 [Magnetic recording layer: Layer consisting of FePt] | | | | | |
| $Fe_{53}Pt_{47}$ | 467 | 1044 | 3.08E+07 | 843 | 2.01E+07 |
| Experimental Example 1 [Magnetic recording layer: Layer consisting of FePtRh] | | | | | |
| $Fe_{48}Pt_{42}Rh_{10}$ | 217 | 708 | 2.03E+07 | 300 | 3.63E+06 |

As shown in Table 1, the FePtRh ordered alloy realized lowering of the Tc without lowering the magnetic properties remarkably at RT.

Example 1 and Comparative Examples 1-2

Example 1

This example is an example of the magnetic recording medium comprising the magnetic recording layer of a single layer as shown in FIG. 1.

In this example, a perpendicular magnetic recording medium was manufactured by forming a Ta layer, a Pt layer, a ZnO layer, a MgO layer, an FePtRh—C magnetic recording layer, and a Pt layer on a nonmagnetic substrate in this order.

As a nonmagnetic substrate, a chemically reinforced glass substrate (N-10 glass substrate, manufactured by HOYA) was prepared. The nonmagnetic substrate was introduced into a sputtering apparatus. The depositions of from the Ta layer to the uppermost Pt protective layer were conducted in a deposition apparatus of an in-line system without ventilation. The Ta layer of 5 nm in thickness was deposited by a DC magnetron sputtering method using a pure Ta target in an Ar atmosphere of 0.3 Pa in pressure. Then, the Pt layer of 10 nm in thickness was deposited by a DC magnetron sputtering method using a pure Pt target in an Ar atmosphere of 0.3 Pa in pressure. Further, the ZnO layer of 2 nm in thickness was deposited by an RF magnetron sputtering method using a ZnO target in an Ar atmosphere of 0.3 Pa in pressure.

Then, after heating the substrate to 400° C., the MgO layer of 5 nm in thickness was deposited by an RF sputtering method using a MgO target in an Ar atmosphere of 0.016 Pa in pressure.

Then, a magnetic recording layer was deposited. The magnetic recording layer was an FePtRh—C layer. After heating the substrate wherein the aforementioned layers were deposited to 480° C., the magnetic recording layer of 4 nm in thickness was deposited by a DC magnetron sputtering method in an Ar gas atmosphere of 1.0 Pa in pressure. As the targets, respective targets of Fe, Pt, Rh and C were used so that the composition in the deposition was the composition of FePtRh—C shown in Table 2. Note that, in Table 2, the composition of Fe, Pt and Rh of the ordered alloy is represented by % by atom, and the composition of the magnetic crystal grain and the nonmagnetic crystal grain boundary of the material of the magnetic recording layer is represented by Vol %.

Finally, by a DC sputtering method using a Pt target in Ar gas of 1.0 Pa in pressure, a Pt protective layer of 5 nm in thickness was formed to give a magnetic recording medium. The temperature of the substrate in the formation of the protective layer was room temperature (25° C.).

Comparative Example 1

A magnetic recording medium was manufactured in the similar way to Example 1 by use of FePtRh as the magnetic material. The magnetic recording layer of 4 nm in thickness was deposited under the deposition conditions of the magnetic recording layer: after heating the substrate wherein the aforementioned layers to the MgO layer were deposited to 480° C. by a DC magnetron sputtering method in an Ar gas atmosphere of 1.0 Pa in pressure. As the targets, respective targets of Fe, Pt and Rh were used so that the composition in the deposition was the composition of FePtRh shown in Table 2. Note that, in Table 2, the composition of Fe, Pt and Rh of the ordered alloy is represented by % by atom.

Comparative Example 2

A magnetic recording medium was manufactured in the similar way to Example 1 by use of FePtRh—$SiO_2$ as a magnetic material. The magnetic recording layer of 4 nm in thickness was deposited under the deposition conditions of the magnetic recording layer, after heating the substrate to 480° C. wherein the respective layers to the MgO layer were deposited by a DC magnetron sputtering method in an Ar gas atmosphere of 1.0 Pa in pressure. As the targets, respective targets of Fe, Pt, Rh and $SiO_2$ were used so that the composition in the deposition was the composition of FePtRh—$SiO_2$ shown in Table 2. Note that, in Table 2, the composition of Fe, Pt and Rh of the ordered alloy is represented by % by atom, and the composition of the magnetic crystal grain and the nonmagnetic crystal grain boundary of the material of the magnetic recording layer is represented by Vol %.

TABLE 2

| | Magnetic recording layer | Composition of magnetic recording layer |
|---|---|---|
| Comparative Example 1 | FePtRh | 50 at % Fe 45 at % Pt 5 at % Rh |
| Example 1 | FePtRh—C | 70 vol % (50 at % Fe 45 at % Pt 5 at % Rh) + 30 vol % C |
| Comparative Example 2 | FePtRh—$SiO_2$ | 70 vol % (50 at % Fe 45 at % Pt 5 at % Rh) + 30 vol % $SiO_2$ |

Evaluations of Example 1 and Comparative Examples 1-2

Referring to Table 3, Ms [film] (emu/$cm^3$), Ms [grain] (emu/$cm^3$), coercive force Hc (kOe) in the perpendicular direction relative to the substrate face, α, Ku [film] (erg/cm³) and Ku [grain] (erg/cm³) of the magnetic recording media prepared in the above Example 1 and Comparative Examples 1-2 were measured. [film] shows a value of property per total volume as the whole of film, and [grain] shows a value of net magnetic material which is calculated by removing the volume of C or $SiO_2$ that is a nonmagnetic material from the whole of film. Furthermore, an integrated intensity of (001) peak of FePt was measured by X-ray diffraction (XRD) analysis. The results are shown in Table 3.

TABLE 3

|  | Ms [film] (emu/cm³) | Ms [grain] (emu/cm³) | Hc [film] (kOe) | α | Ku [film] (erg/cm³) | Ku [grain] (erg/cm³) | I(001) integrated intensity |
|---|---|---|---|---|---|---|---|
| Comparative Example 1 | 863 | 863 | 15.8 | 1.48 | 2.12E+07 | 2.1E+07 | 4379 |
| Example 1 | 604 | 863 | 20.1 | 0.60 | 1.68E+07 | 2.4E+07 | 3018 |
| Comparative Example 2 | 538 | 769 | 1.4 | 1.79 | 5.39E+06 | 7.7E+06 | 366 |

The value of the saturation magnetization Ms of FePtRh of Comparative Example 1 was 863 emu/cm³. In contrast, in the case of FePtRh—C of Example 1, the net Ms [grain] of the magnetic material was 863 emu/cm³ and was not lowered. On the other hand, in the case of FePtRh—$SiO_2$ of Comparative Example 2, the net Ms [grain] of the magnetic material was 769 emu/cm³ and was lowered, showing the magnetic properties being deteriorated.

In FePtRh of Comparative Example 1, the coercive force Hc in the perpendicular direction relative to the substrate face was as small as 15.8 kOe, and the slope α of the magnetization curve was as large as 1.48. These show that, in the magnetic recording layer wherein FePtRh was used, magnetic grain separation as the granular structure is not obtained. In contrast, in the magnetic recording layer wherein FePtRh—C of Example 1 was used, Hc showed a value of 20.1 kOe, resulting in increasing of Hc in comparison with Comparative Example 1. In addition, the value α of Example 1 was 0.60. This value is no more than the value α=1.0 being the criterion whether a magnetic material has the granular structure or not in the magnetic recording layer, from which, in the magnetic recording layer wherein FePtRh—C of Example 1 was used, the magnetic grain separation as the granular structure is assumed to be realized.

On the other hand, in FePtRh—$SiO_2$ of Comparative Example 2, Hc was as small as 1.4 kOe, and the value α was as large as 1.79. These show that, in the magnetic recording medium of Comparative Example 2, the magnetic properties are extremely deteriorated and the grain separation of the magnetic recording layer is not obtained.

Next, with respect to the magnetic anisotropic constant Ku, in the case where FePtRh of Comparative Example 1 was used, Ku was 2.1E+07 erg/cm³. In contrast, in the case where FePtRh—C of Example 1 was used, Ku [grain] which is the net Ku value of the magnetic material was 2.4E +07 erg/cm³, and the value of Ku is not lowered in comparison with Comparative Example 1. On the other hand, in the case where FetPRh—$SiO_2$ of Comparative Example 2 was used, Ku [grain] was 7.7E+06 erg/cm³, and the value of Ku being extremely lowered. This shows that, in Comparative Example 2, the magnetic anisotropic energy is also extremely deteriorated.

Next, with respect to the integrated intensity of (001) peak of FePt obtained by the X-ray diffraction (XRD) analysis, in the case where FePtRh of Comparative Example 1 was used, the integrated intensity was 4379, and in the case where FePtRh—C of Example 1 was used, the integrated intensity was 3018. The results show that the values are almost equivalent from the viewpoint of volume conversion of FePtRh (3018/0.7=4311).

These show that, even when C is added to FePtRh, the magnetic properties of the FePtRh ordered alloy are maintained and the degree of order is almost not affected adversely. Accordingly, in FePtRh—C, the lowering of Tc is expected similarly to the FePtRh ordered alloy. Note that the degree of order is an indicator that shows an extent of order how the Fe face and the Pt face are arranged alternately to the substrate face of the $L1_0$ type crystal, and since the orientation of the (001) face is equivalent, it is assumed that the degree of order is also equal.

On the other hand, in the case where FePtRh—$SiO_2$ of Comparative Example 2 was used, the integrated intensity of (001) peak of FePt was extremely lowered as small as 366. This shows that the FePtRh—$SiO_2$ of Comparative Example 2 has almost not become an ordered alloy.

From the above results, in order to make the FePtRh alloy granulated by grain separation magnetically, the addition of C is effective. Even when C is added to the FePtRh alloy, lowering of the degree of order and lowering of magnetic properties are not observed. On the other hand, when $SiO_2$ was added as the material for the nonmagnetic grain boundary, the FePtRh alloy may not be granulated, and, in addition, the degree of order was extremely lowered and the magnetic properties were extremely deteriorated.

Example 2, Comparative Examples 3-4, and Reference Example 1

This example is an example of the magnetic recording layer composed of a plurality of layers.

Example 2

A perpendicular magnetic recording medium was manufactured having a nonmagnetic substrate, and a Ta layer, a Pt layer, a ZnO layer, a MgO layer, a second magnetic recording layer (FePt—C), a first magnetic recording layer (FePtRh—BC), a Pt and Ta protective layer provided on the nonmagnetic substrate in this order.

As the nonmagnetic substrate, a chemically reinforced glass substrate (N-10 glass substrate, manufactured by HOYA) was prepared. The nonmagnetic substrate was introduced into a sputtering apparatus. The depositions from the Ta layer to the uppermost Pt and Cr protective layer were conducted in a deposition apparatus of an in-line system without ventilation. The Ta layer of 5 nm in thickness was deposited by a DC magnetron sputtering method using a pure Ta target in an Ar atmosphere of 0.3 Pa in pressure. Then, the Pt layer of 10 nm in thickness was deposited by a DC magnetron sputtering method using a pure Pt target in an Ar atmosphere of 0.3 Pa in pressure. Further, the ZnO layer of 2 nm in thickness was deposited by an RF magnetron sputtering method using a ZnO target in an Ar atmosphere of 0.3 Pa in pressure.

Then, after heating the substrate to 400° C., the MgO layer of 5 nm in thickness was deposited by an RF sputtering method using a MgO target in an Ar atmosphere of 0.016 Pa in pressure.

Then, a magnetic recording layer was deposited. The second magnetic recording layer was an FePt—C layer. After heating the substrate wherein the aforementioned respective layers were deposited to 480° C., the magnetic recording layer of 2 nm in thickness was deposited by a DC magnetron sputtering method in an Ar gas atmosphere of 1.0 Pa in pressure. As the targets, respective targets of Fe, Pt, Rh and C were used so that the composition in the deposition was the composition of FePt—C shown in Table 4. Note that, in Table 4, the composition of Fe and Pt of the ordered alloy is represented by % by atom, and the composition of the magnetic crystal grain and the nonmagnetic crystal grain boundary of the material of the magnetic recording layer is represented by Vol %.

Then, the first magnetic recording layer was deposited. The first magnetic recording layer of this Example is an FePtRh—BC layer. The depositions were carried out as the following manner. After heating the substrate wherein the second magnetic recording layer was deposited as mentioned above to 480° C., the first magnetic recording layer having the thickness shown in Table 5 was deposited by a DC magnetron sputtering method for the elements other than B, and by an RF magnetron sputtering method for B. An FePtRh—BC layer was deposited in an Ar gas atmosphere of 1.0 Pa in degree of vacuum. As the targets, respective targets of Fe, Pt, Rh, B and C were used.

Finally, by a DC sputtering method using a Pt target in Ar gas of 1.0 Pa in pressure, a Pt protective layer of 5 nm in thickness and a Ta protective layer of 5 nm in thickness were formed to give a magnetic recording medium. The temperature of the substrate in the formation of the protective layer was room temperature (25° C.). The compositions of the magnetic recording layer are shown in Table 4. Note that, in Table 4, the composition of Fe, Pt and Rh of the ordered alloy is represented by % by atom, and the composition of respective elements of the magnetic crystal grain and the nonmagnetic crystal grain boundary of the material of the magnetic recording layer is represented by Vol %. In addition, the thickness of the first magnetic recording layer of Example 2 is shown in Table 5.

Comparative Examples 3-4

As Comparative Example 3, a magnetic recording medium was manufactured wherein FePtMn—BC was used as the material of the first magnetic recording layer. Further, as Comparative Example 4, a magnetic recording medium wherein FePtNi—BC was used as the material of the first magnetic recording layer was manufactured. The magnetic recording media wherein these materials were used may be manufactured in the similar manner to Example 2 except that a Mn target or a Ni target was used instead of the Rh target of the first magnetic recording layer, respectively. Note that, the compositions in the deposition are shown in Table 4. Note that, in Table 4, the composition of Fe, Pt and Mn or Ni of the ordered alloy is represented by % by atom, and the composition of respective elements of the magnetic crystal grain and the nonmagnetic crystal grain boundary of the material of the magnetic recording layer is represented by Vol %. In addition, the thicknesses of the first magnetic recording layer of Comparative Example 3 and Comparative Example 4 are shown in Table 5.

Reference Example 1

As Reference Example 1, a magnetic recording medium was manufactured wherein FePt—BC was used as the material of the first magnetic recording layer. The magnetic recording media wherein the material was used, may be manufactured in the similar procedure to Example 2 except that the first magnetic recording layer was deposited without use of the Rh target of the first magnetic recording layer. The composition in the deposition is shown in Table 4. Note that, in Table 4, the composition of Fe and Pt of the ordered alloy is represented by % by atom, and the composition of respective elements of the magnetic crystal grain and the nonmagnetic crystal grain boundary of the material of the magnetic recording layer is represented by Vol %. The thickness of the first magnetic recording layer of Reference Example 1 is shown in Table 5.

TABLE 4

| | Magnetic recording layer[1] | Composition of magnetic recording layer | |
|---|---|---|---|
| | | Composition of first magnetic recording layer | Composition of second magnetic recording layer |
| Example 2 | FePtRh—BC/ FePt—C | 80 vol % (45 at % Fe47 at % Pt8 at % Rh) + 15 vol % B + 5 vol % C | 60 vol % (50 at % Fe50 at % Pt) + 40 vol % C |
| Comparative Example 3 | FePtMn—BC/ FePt—C | 80 vol % (42 at % Fe50 at % Pt8 at % Mn) + 15 vol % B + 5 vol % C | 60 vol % (50 at % Fe50 at % Pt) + 40 vol % C |
| Comparative Example 4 | FePtNi—BC/ FePt—C | 80 vol % (42 at % Fe50 at % Pt8 at % Ni) + 15 vol % B + 5 vol % C | 60 vol % (50 at % Fe50 at % Pt) + 40 vol % C |
| Reference Example 1 | FePt—BC/ FePt—C | 80 vol % (50 at % Fe50 at % Pt) + 15 vol % B + 5 vol % C | 60 vol % (50 at % Fe50 at % Pt) + 40 vol % C |

[1]The structure of layer of the magnetic recording layer is first magnetic recording layer/second magnetic recording layer.

Evaluation

The evaluation of the magnetic recording medium was conducted by evaluating Ku [film] (erg/cm$^3$), Hc [film] (kOe), α, and an integrated intensity of (001) peak of FePt which is an indicator that shows a degree of order of the $L1_0$ type crystal structure. The results are summarized in Table 5 and graphs in FIGS. 3-6.

TABLE 5

| | First magnetic recording layer/ Second magnetic recording layer | | | Hc | | Ku | I(001) |
|---|---|---|---|---|---|---|---|
| | Magnetic material | Thickness[1] (nm) | Thickness[2] (nm) | [film] (kOe) | α [film] | [film] (erg/cm$^3$) | integrated intensity |
| Reference Example 1 | FePt—BC/ FePt—C | 3 5 7 9 | 2 2 2 2 | 20.4 18.4 14.8 13.2 | 0.7 0.7 0.8 0.8 | 1.67E+07 1.60E+07 1.50E+07 1.30E+07 | 1.18 1.77 1.73 1.91 |
| Example 2 | FePtRh—BC/ FePt—C | 3 5 7 9 | 2 2 2 2 | 20.2 18.6 13.4 13.3 | 0.6 0.8 1.0 0.9 | 1.48E+07 1.35E+07 1.32E+07 1.24E+07 | 1.32 2.07 2.19 2.38 |
| Comparative Example 3 | FePtMn—BC/ FePt—C | 3 5 7 9 | 2 2 2 2 | 12.3 4.8 5.8 — | 0.2 0.3 0.3 — | 9.60E+06 7.80E+06 6.70E+06 — | 0.98 0.86 0.91 — |
| Comparative Example 4 | FePtNi—BC/ FePt—C | 3 5 7 9 | 2 2 2 2 | 22.3 18.2 15.8 — | 0.5 0.4 0.5 — | 1.31E+07 1.29E+07 1.17E+07 — | 1.68 1.72 2.43 — |

[1] The thickness of the first magnetic recording layer.
[2] The thickness of the second magnetic recording layer.

When FePtRh—BC in Example 2 was used for the first magnetic recording layer, the coercive force Hc and the α value were obtained which were equivalent to those of Reference Example 1 wherein FePt—BC was used for the first magnetic recording layer. Further, the result of Ku of Example 2 shows lowering of Ku due to the addition of Rh. However, this lowering is equivalent to the lowering which is shown by the result of calculating from the case where Rh is added to FePt wherein the nonmagnetic grain boundary material is not used. Accordingly, in comparison to Reference Example 1, lowering of Ku due to the material (BC) of the nonmagnetic crystal grain boundary has not been observed.

When FePtMn—BC in Comparative Example 3 was used for the first magnetic recording layer, Hc, α and Ku were extremely lowered in comparison to those of Reference Example 1 wherein FePt—BC was used for the first magnetic recording layer. Further, in Comparative Example 3, the integrated intensity of (001) peak of FePt which is an indicator showing the L1$_0$ order was also flat relative to the increase of the thickness of the first magnetic recording layer, showing the first magnetic recording layer being not ordered. Furthermore, in Comparative Example 3, a large kink in the M-H hysteresis loop was observed. From this result, in the magnetic recording layer of Comparative Example 3, the epitaxial growth is assumed to be reset with the increase of the thickness to generate a phase having a different magnetic property in the magnetic recording layer.

When FePtNi—BC in Comparative Example 4 was used for the first magnetic recording layer, Hc was almost equivalent to that of Reference Example 1 wherein FePt—BC was used for the first magnetic recording layer. However, the α value is small and the variation of magnetic properties of every grain of magnetic crystal grains is large. Furthermore, in Comparative Example 4, a kink was observed included in the M-H hysteresis loop. From this result, in the magnetic recording layer of Comparative Example 4, the epitaxial growth is assumed to be reset with the increase of the thickness to generate a phase having a different magnetic property in the magnetic recording layer.

When FePtRh—BC in Example 2 was used for the first magnetic recording layer, the magnetic recording layer was composed of grains having a grain size of 5-10 nm from an image of a plane transmission electron microscope (TEM). This is equivalent to a grain size of 5-10 nm in the case of Reference Example 1. Further, a width of the nonmagnetic grain boundary of Example 2 was also equivalent to a width of the nonmagnetic grain boundary of Reference Example 1. Accordingly, in Example 2, the magnetic recording layer had a good grain separation.

Note that, the grain size herein was determined by the following procedure from an image of the plane transmission electron microscope (TEM). From the TEM image of 500,000 magnifications, 300 or more grains were randomly selected, and each image of the selected grains being captured by tracing the grain one by one. Thereafter, from the area of each grain, an equivalent circle diameter was calculated. An average value of the equivalent circle diameters was taken to be a grain size.

When FePtMn—BC in Comparative Example 3 was used for the first magnetic recording layer, the magnetic recording layer had grains with 3-10 nm in grain size from the plane TEM image. Further, in the magnetic recording layer, some fine grains of approximately 3 nm in grain size were observed. Furthermore, the magnetic recording layer had a tendency that the nonmagnetic grain boundary material was gathered around triple point of the grain, and the width of the nonmagnetic grain boundary was not uniform.

From the sectional TEM of Comparative Example 3, the columnar growth of the magnetic material was reset at the thickness of 3-5 nm from the surface of the MgO layer, and, in the part more than the thickness, the secondary growth of the magnetic grain existed.

From these results, it is assumed that, when FePtMn—BC in Comparative Example 3 is used for the first magnetic recording layer, as the thickness of the magnetic recording layer becomes large, the columnar growth of the magnetic material may not be maintained, the fine secondary grains which are not epitaxially grown from the MgO layer are grown, and the so-called secondary growth is generated, which results in lowering of Hc and Ku, etc.

When FePtNi—BC in Comparative Example 4 was used for the first magnetic recording layer, the magnetic recording layer had grains of 5-20 nm in grain size from the plane TEM image. Further, among grains in the magnetic recording layer, some coarse grains of 10 nm or more in grain size were observed. Furthermore, the variation of the width of the nonmagnetic grain boundary of the magnetic material was also large.

Conclusion

From the comparison of experimental results of the above Experimental Examples, Examples and Comparative Examples, by use of FePt—C as the second magnetic recording layer, and, in combination therewith, by providing the magnetic recording layer having the granular structure of the ordered alloy—nonmagnetic grain boundary material which was used in the above Examples as the first magnetic recording layer, it is possible that the larger thickness of the magnetic recording layer as a whole could be realized with preservation of the high magnetic anisotropy. Further, the magnetic materials such as FePtRh—C and FePtRh—BC wherein Rh is added may be expected to allow to lower Tc thereof.

Industrial Applicability

The magnetic recording medium of the present invention is applicable to a magnetic recording apparatus which includes a perpendicular magnetic recording medium including a magnetic recording medium of an energy-assisted method such as a heat-assisted method or a microwave-assisted method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. All of the patent applications and documents cited herein are incorporated herein by reference in their entirety.

What is claimed is:

1. A perpendicular magnetic recording medium comprising:
   a nonmagnetic substrate; and
   a magnetic recording layer on the nonmagnetic substrate, wherein:
   said magnetic recording layer has a granular structure including a first magnetic crystal grain and a first nonmagnetic crystal grain boundary surrounding said first magnetic crystal grain,
   said first magnetic crystal grain consists of an ordered alloy having, by atom, 30-70% Fe, 30-70% Pt and 1-25% Rh, said ordered alloy being an $L1_0$ type ordered alloy, and
   said first nonmagnetic crystal grain boundary consists of carbon, boron or a combination thereof, an amount of said first nonmagnetic crystal grain boundary being, by volume, in a range of 10% to 50% of a total amount of a material of said magnetic recording layer.

2. The perpendicular magnetic recording medium according to claim 1, further comprising:
   an adhesion layer on the nonmagnetic substrate; and
   a seed layer on the adhesion layer,
   wherein a thickness of the magnetic recording layer is between 3 nm and 9 nm.

3. The perpendicular magnetic recording medium according to claim 2, wherein the seed layer has a NaCl type crystal structure.

4. The perpendicular magnetic recording medium according to claim 1, wherein the magnetic recording layer consists of a single layer.

5. A perpendicular magnetic recording medium comprising:
   a nonmagnetic substrate; and
   a magnetic recording layer on the nonmagnetic substrate, wherein:
   said magnetic recording layer is composed of a plurality of layers comprising at least a first magnetic recording layer and a second magnetic recording layer,
   said first magnetic recording layer has a granular structure including a first magnetic crystal grain and a first nonmagnetic crystal grain boundary surrounding said first magnetic crystal grain,
   said first magnetic crystal grain consists of an ordered alloy having, by atom, 30-70% Fe, 30-70% Pt and 1-25% Rh, said ordered alloy being an $L1_0$ type ordered alloy,
   said first nonmagnetic crystal grain boundary consists of carbon, boron or a combination thereof, an amount of said first nonmagnetic crystal grain boundary being, by volume, in a range of 10% to 50% of a total amount of a material of said magnetic recording layer,
   said second magnetic recording layer has a granular structure including a second magnetic crystal grain and a second nonmagnetic crystal grain boundary surrounding said second magnetic crystal grain,
   said second magnetic crystal grain consists of an FePt ordered alloy or an ordered alloy having Fe, Pt and Rh, and
   said second nonmagnetic crystal grain boundary comprises carbon.

6. The perpendicular magnetic recording medium according to claim 5, further comprising:
   an adhesion layer on the nonmagnetic substrate; and
   a seed layer on the adhesion layer,
   wherein the first magnetic recording layer is formed on the second magnetic recording layer, and the second magnetic recording layer is formed on the seed layer,
   a thickness of the first magnetic recording layer is between 3 nm and 9 nm, and
   a thickness of the second magnetic recording layer is 4 nm or less.

7. The perpendicular magnetic recording medium according to claim 6, wherein the seed layer has a NaCl type crystal structure.

8. The perpendicular magnetic recording medium according to claim 5, wherein
   said first magnetic recording layer is FePtRh—C or FePtRhBC, and
   said second magnetic recording layer is FePt—C.

9. The perpendicular magnetic recording medium according to claim 5, wherein
   said first magnetic recording layer is FePtRh—C or FePtRhBC, and
   said second magnetic recording layer is FePtRh—C.

* * * * *